(12) United States Patent
Lim et al.

(10) Patent No.: US 12,489,163 B2
(45) Date of Patent: Dec. 2, 2025

(54) RECHARGEABLE BATTERY MODULE

(71) Applicant: SAMSUNG SDI CO., LTD., Yongin-si (KR)

(72) Inventors: Dooyong Lim, Yongin-si (KR); Gunyeob Park, Yongin-si (KR); Seongjoon Park, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 635 days.

(21) Appl. No.: 17/902,128

(22) Filed: Sep. 2, 2022

(65) Prior Publication Data
US 2023/0071616 A1    Mar. 9, 2023

(30) Foreign Application Priority Data
Sep. 7, 2021    (KR) .......................... 10-2021-0119184

(51) Int. Cl.
*H01M 50/209*    (2021.01)
*H01M 50/271*    (2021.01)

(52) U.S. Cl.
CPC ....... *H01M 50/209* (2021.01); *H01M 50/271* (2021.01)

(58) Field of Classification Search
None
See application file for complete search history.

(56) References Cited

U.S. PATENT DOCUMENTS

| | | | |
|---|---|---|---|
| 10,236,489 B2* | 3/2019 | Chen | H01M 50/227 |
| 10,720,618 B2 | 7/2020 | Long et al. | |
| 2018/0034024 A1 | 2/2018 | Chen et al. | |

FOREIGN PATENT DOCUMENTS

| | | |
|---|---|---|
| CN | 207719286 U | 8/2018 |
| CN | 211238404 U | 8/2020 |
| CN | 212991185 U | 4/2021 |

OTHER PUBLICATIONS

Machine Translation of Chinese Patent Publication No. 211238404 (Year: 2020).*
European Search Report dated Jan. 27, 2023.

* cited by examiner

*Primary Examiner* — Wyatt P McConnell
(74) *Attorney, Agent, or Firm* — Lee IP Law, P.C.

(57) ABSTRACT

A rechargeable battery module includes a plurality of unit cells that are stacked in a first direction and electrically connected with each other; an end cell cover that is adjacent to an outermost unit cell in the first direction among the plurality of unit cells, the end cell cover including at least one adhesive accommodation buffer adjacent to an edge thereof; an end plate at an outer side of the end cell cover and configured to support the plurality of unit cells by pressing the plurality of unit cells in the first direction; and a side plate that extends in the first direction and is configured to support a side surface of the plurality of unit cells.

17 Claims, 9 Drawing Sheets

RECHARGEABLE BATTERY MODULE

CROSS-REFERENCE TO RELATED APPLICATION

This application claims priority to and the benefit of Korean Patent Application No. 10-2021-0119184 filed in the Korean Intellectual Property Office on Sep. 7, 2021, the entire content of which is incorporated herein by reference.

BACKGROUND

1. Field

Embodiments relate to a rechargeable battery module.

2. Description of the Related Art

Unlike a primary battery, a rechargeable battery is a battery that may be repeatedly charged and discharged. A small-capacity rechargeable battery may be used for portable small electronic devices such as portable phones, tablet computers, and laptop computers, and a large-capacity rechargeable battery may be used as a power source for driving motors in hybrid vehicles and electric vehicles.

A rechargeable battery may be a unit cell for a small electronic device, or may be in a module state in which a plurality of unit cells are electrically connected for driving a motor and a pack state in which a plurality of these modules are connected again.

A rechargeable battery module may be configured by stacking and arranging a plurality of unit cells in one direction. An end plate may be at both ends according to an arrangement direction of the rechargeable battery module, and a side plate may be on both sides to fix the plurality of arranged unit cells.

SUMMARY

The embodiments may be realized by providing a rechargeable battery module including a plurality of unit cells that are stacked in a first direction and electrically connected with each other; an end cell cover that is adjacent to an outermost unit cell in the first direction among the plurality of unit cells, the end cell cover including at least one adhesive accommodation buffer adjacent to an edge thereof; an end plate at an outer side of the end cell cover and configured to support the plurality of unit cells by pressing the plurality of unit cells in the first direction; and a side plate that extends in the first direction and is configured to support a side surface of the plurality of unit cells.

The at least one adhesive accommodation buffer may include at least one accommodation groove at the edge of the end cell cover, the at least one adhesive accommodation groove having an opening that is open outwardly in a second direction that is perpendicular to a plane of the side plate.

The at least one accommodation groove of the at least one adhesive accommodation buffer may extend inwardly to have a depth in the second direction.

The at least one accommodation groove of the at least one adhesive accommodation buffer may include a plurality of separate accommodation grooves.

An inlet end of the at least one accommodation groove of the at least one adhesive accommodation buffer may be aligned with a narrow side of the outermost unit cell.

The opening of the at least one accommodation groove of the at least one adhesive accommodation buffer may be covered by the side plate.

The end cell cover may include a first side facing the outermost unit cell and a second side facing the end plate, and the at least one adhesive accommodation buffer may protrude from the second side of the end cell cover.

The at least one adhesive accommodation buffer may have an inclined shape that protrudes higher proximate to the edge of the end cell cover.

The end cell cover may have a rectangular shape, and the at least one adhesive accommodation buffer may include four adhesive accommodation buffers that are adjacent to four corners of the end cell cover, respectively.

The embodiments may be realized by providing a rechargeable battery module including a plurality of unit cells that are stacked in a first direction and electrically connected with each other; an end plate that is configured to support the plurality of unit cells, the end plate being adjacent to an outermost unit cell in a first direction of the plurality of unit cells and including at least one adhesive accommodation buffer adjacent to an edge thereof; and a side plate that extends in the first direction and is configured to support a side surface of the plurality of unit cells.

The at least one adhesive accommodation buffer may include at least one accommodation groove at the edge of the end plate, the at least one accommodation groove having an opening that is open outwardly in a second direction that is perpendicular to a plane of the side plate.

The at least one accommodation groove of the at least one adhesive accommodation buffer may extend inwardly to have a depth in the second direction.

The at least one accommodation groove of the at least one adhesive accommodation buffer may include a plurality of separate accommodation grooves.

An inlet end of the at least one accommodation groove of the at least one adhesive accommodation buffer may be aligned with a narrow side of the outermost unit cell.

The opening of the at least one accommodation groove of the at least one adhesive accommodation buffer may be covered by the side plate.

BRIEF DESCRIPTION OF THE DRAWINGS

Features will be apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or element, it can be directly on the other layer or element, or intervening layers may also be present. addition, it will also be understood that when a layer is referred to as being "between" two layers, it can be the only layer between the two layers, or one or more intervening layers may also be present. Like reference numerals refer to like elements throughout.

Terms including ordinal numbers such as first, second, and the like may be used to describe various configurations elements, but the constituent elements are not limited by the terms. The terms are only used for the purpose of distinguishing one constituent element from another.

It will be understood that when an element is referred to as being "directly on" another element, there are no intervening elements present. Further, throughout the specification, the word "on" a target element will be understood to mean positioned above or below the target element, and will not necessarily be understood to mean positioned "at an upper side" based on an opposite to gravity direction.

In the present application, terms such as "comprise" or "include" are intended to designate the existence of features, numbers, steps, operations, constituent elements, parts, or combinations thereof described in the specification, and it is to be understood that this does not preclude in advance the possibility of the presence or addition of one or more other features or numbers, steps, actions, constituent elements, parts or combinations thereof. Unless defined otherwise, all terms used herein, including technical or scientific terms, have the same meaning as commonly understood by a person of an ordinary skill in the art to which the present invention belongs.

Further, throughout the specification, the phrase "on a plane" means viewing a target portion from the top, and the phrase "on a cross-section" means viewing a cross-section formed by vertically cutting a target portion from the side.

In addition, throughout the specification, when "connected to" in the entire specification, this does not only mean that two or more constituent elements are directly connected, but also means that two or more constituent elements are indirectly connected, physically connected, and electrically connected through other constituent elements, or being referred to by different names depending on the position or function, while being integral.

Figure 1:
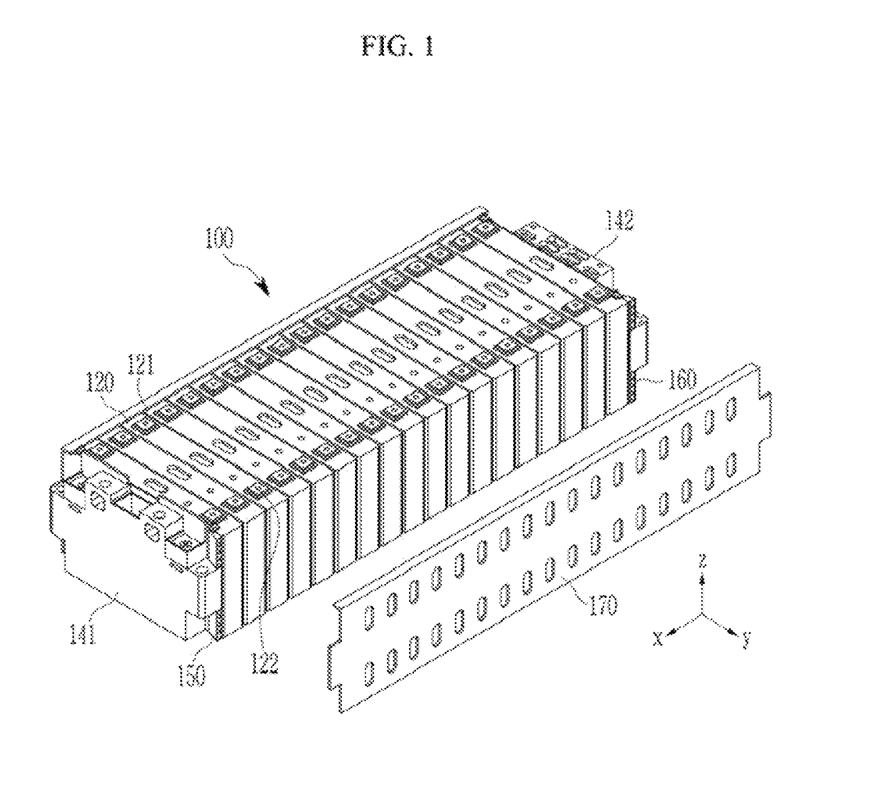
FIG. 1 is partial exploded perspective view of a rechargeable battery module according to an embodiment.
Figure 2:
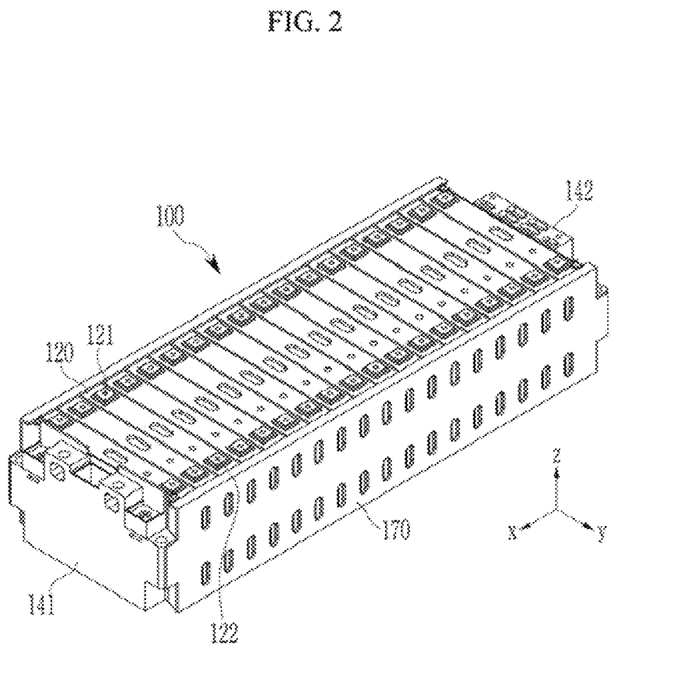
FIG. 2 is a perspective view of the rechargeable battery according to the embodiment.

FIG. 1 is partial exploded perspective view of a rechargeable battery module according to an embodiment, and FIG. 2 is a perspective view of the rechargeable battery according to the embodiment.

Referring to FIG. 1 and FIG. 2, a rechargeable battery module 100 according to the present embodiment may include a plurality of unit cells 120, end plates 141 and 142 (that are at outermost sides of outermost unit cells 120 of the plurality of unit cells 120), and side plates 170 on and configured to support side surfaces of the plurality of unit cells 120. End cell covers 150 and 160 may be respectively between the outermost unit cell 120 and the end plates 141 and 142. In an implementation, the end cell covers 150 and 160 may be adjacent to the outermost unit cells 120, and the end plates 141 and 142 may be on outer sides of the respective end cell covers 150 and 160.

The plurality of unit cells 120 may be arranged and stacked in a first direction (X-axis direction in the drawing) and may be electrically and mechanically connected to each other. In an implementation, each unit cell of the plurality of unit cells 120 may be a prismatic rechargeable battery, and may be electrically connected through a bus bar.

In an implementation, each unit cell 120 may include an electrode assembly and a case for embedding the same, a cap plate coupled to an opening of the case, and a first electrode terminal 121 and a second electrode terminal 122 on the cap plate. In an implementation, the first electrode terminal 121 may be a negative terminal, and the second electrode terminal 122 may be a positive terminal.

The end cell covers 150 and 160 may be adjacent to the outermost unit cells 120 in the first direction of the plurality of unit cells 120. The outermost unit cells 120 of the plurality of unit cells 120 are positioned at both ends in the first direction, and a pair of end cell covers 150 and 160 may be included, e.g., one at each end. The end cell covers 150 and 160 may be made of an insulating material, and thus the outermost unit cells 120 and the end plates 141 and 142 may be electrically insulated.

The end plates 141 and 142 may be supported by pressing the plurality of unit cells 120 in the first direction while being in close contact with the outside of the end cell covers 150 and 160. In an implementation, one pair of end plates 141 and 142 may be on the outer side of a pair of end cell covers 150 and 160 adjacent to both outermost unit cells 120. The pair of end cell covers 150 and 160 may be fixed while pressing the plurality of unit cells 120 along the first direction by a separately provided fastener.

The side plate 170 may have a plate shape extending (e.g., lengthwise) in the first direction, and may be configured to support the side plate of the plurality of unit cells 120. The side plate 170 may partially protrude from or beyond both ends (of the plurality of unit cells 120) in the first direction to be connected to the end plates 141 and 142, and may be bent inwardly at upper and lower ends to be fixed to or on upper and lower edges of the plurality of unit cells 120. One pair of side plates 170 may be on both sides of the plurality of unit cells 120.

As a length of the module increases and the volume ratio to the height of the unit cells 120 increases, an adhesive, e.g., a bond, may be applied to the side plate 170 to help reinforce the rigidity of the module. In an implementation, the side plate 170 may be fixed by pressing it to the side surfaces of the plurality of unit cells 120 in a state in which an adhesive is applied.

Figure 3:
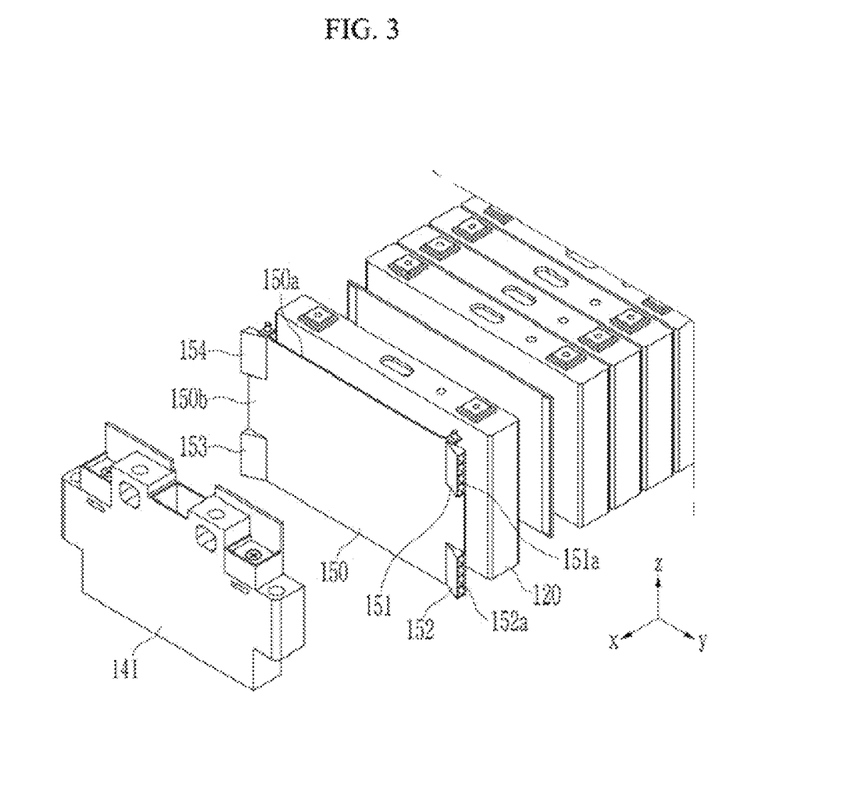
FIG. 3 is an exploded perspective view of a part of the rechargeable battery according to the embodiment.
Figure 4:
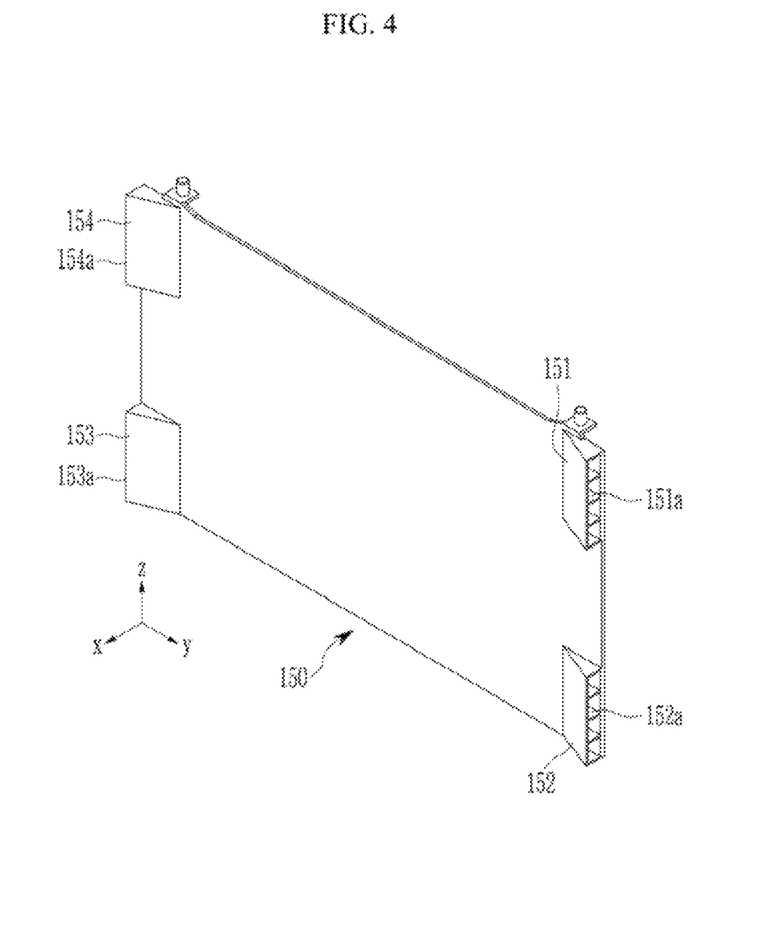
FIG. 4 is a perspective view of an end cell cover of the rechargeable battery module according to the embodiment.

FIG. 3 is an exploded perspective view of a part of the rechargeable battery according to the embodiment, and FIG. 4 is a perspective view of an end cell cover of the rechargeable battery module according to the embodiment.

Referring to FIG. 3 and FIG. 4, the end cell cover 150 may have a planar rectangular shape approximately corresponding to a wide side shape of the unit cell 120. In an implementation, the end cell cover 150 may include a first surface 150a facing the outermost unit cell 120 and a second surface 150b facing the end plates 141 and 142. The other end cell cover 160 may have the same structure as that of the end cell cover 150.

In an implementation, the end cell cover 150 may include adhesive accommodation buffers 151, 152, 153, and 154 adjacent to or at edges thereof. In an implementation, the adhesive accommodation buffers 151, 152, 153, and 154 may be adjacent to the four corners of the end cell cover 150, respectively. In an implementation, the adhesive accommodation buffers 151, 152, 153, and 154 may protrude from and be on the second surface 150b (e.g., outward facing surface) of the end cell cover 150. The adhesive accommodation buffers 151, 152, 153, and 154 may protrude higher toward the edge from the second surface 150b of the end cell cover 150. In an implementation, the height of the adhesive accommodation buffers 151, 152, 153, and 154 protruding on or from the second surface 150b may gradually decrease from the edge of the second surface 150b toward the inside or interior.

The adhesive accommodation buffers 151, 152, 153, and 154 may include accommodation grooves 151a, 152a, 153a, and 154a that are open outwardly from the edge of the end cell cover 150. The accommodation grooves 151a, 152a, 153a, and 154a may be open outwardly (e.g., may have an opening facing) in the second direction (Y-axis direction in the drawing) that is perpendicular to (e.g., a major plane of) the side plate 170. The accommodation grooves 151a, 152a, 153a, and 154a may extend to have a depth in the second direction (e.g., may extend inwardly from the edge of the end cell cover 150), and may be divided into a plurality of pieces (e.g., may include a plurality of separate grooves in each of the adhesive accommodation buffers 151, 152, 153, and 154).

In an implementation, inlet ends of the accommodation grooves 151a, 152a, 153a, and 154a may be aligned (e.g., parallel or coplanar) with a narrow side of the outermost unit cells 120. The accommodation grooves 151a, 152a, 153a, and 154a of the adhesive accommodation buffers 151, 152, 153, and 154 may be closed or covered by the side plate 170 (see FIG. 2).

When applying the adhesive to the side plate 170, even if it is applied to a portion close to the edge, adhesive overflowed during compression may be accommodated in the accommodation grooves 151a, 152a, 153a, and 154a of the adhesive accommodation buffers 151, 152, 153, and 154. Therefore, it is possible to minimize a decrease in performance that could otherwise occur due to a non-adhesive (unfilled) region caused by parts and assembly tolerances of the side plate 170.

FIG. 5A to FIG. 5D are process diagrams showing stages in some processes of manufacturing a rechargeable battery module according to an embodiment.

Figure 5A:
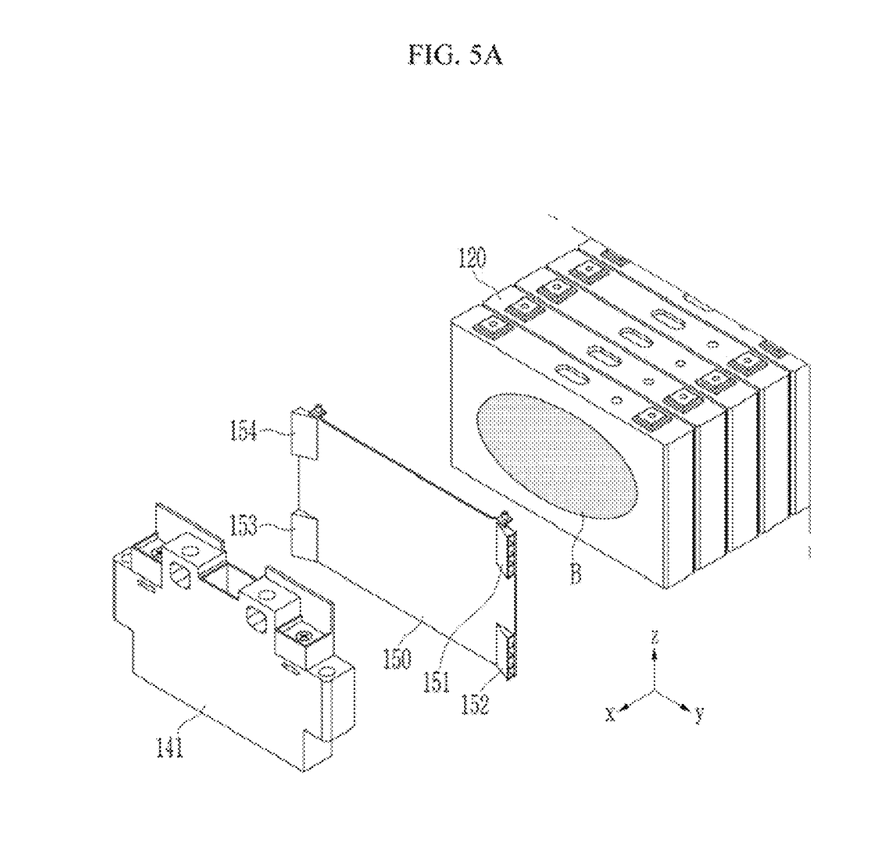
FIG. 5A to FIG. 5D are process diagrams showing stages in some processes of manufacturing a rechargeable battery module according to an embodiment.

First, the plurality of unit cells 120 may be stacked, and an adhesive B may be applied to an outer wide side of the outermost unit cell 120 among the stacked unit cells 120 (see FIG. 5A).

Figure 5B:
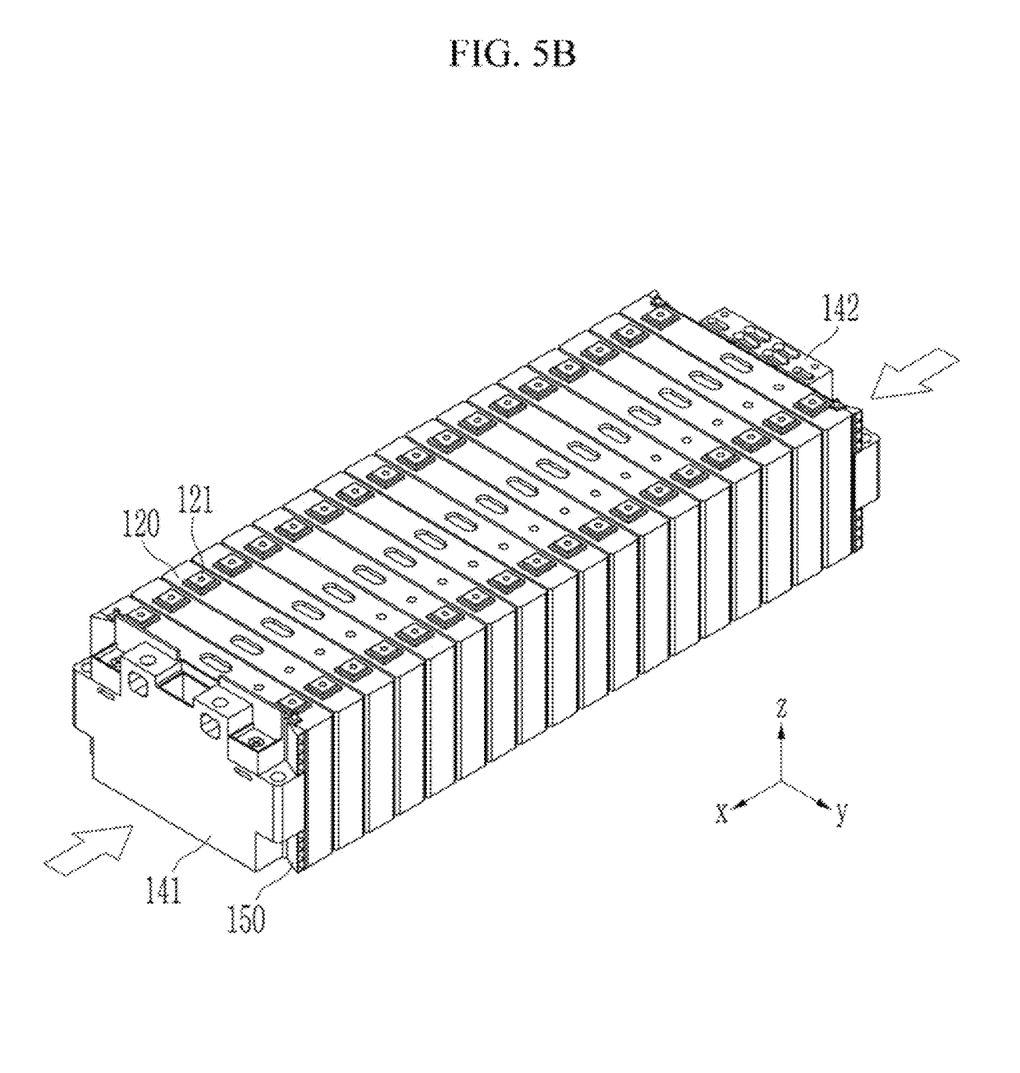

Next, from both ends of the stacked unit cells 120 in the first direction (X-axis direction in the drawing), the end cell covers 150 and 160 may be pressed and attached to the outermost unit cells 120 coated with the adhesive B, and the end plates 141 and 142 may be attached to the outside while being adjacent thereto (see FIG. 5B).

Figure 5C:
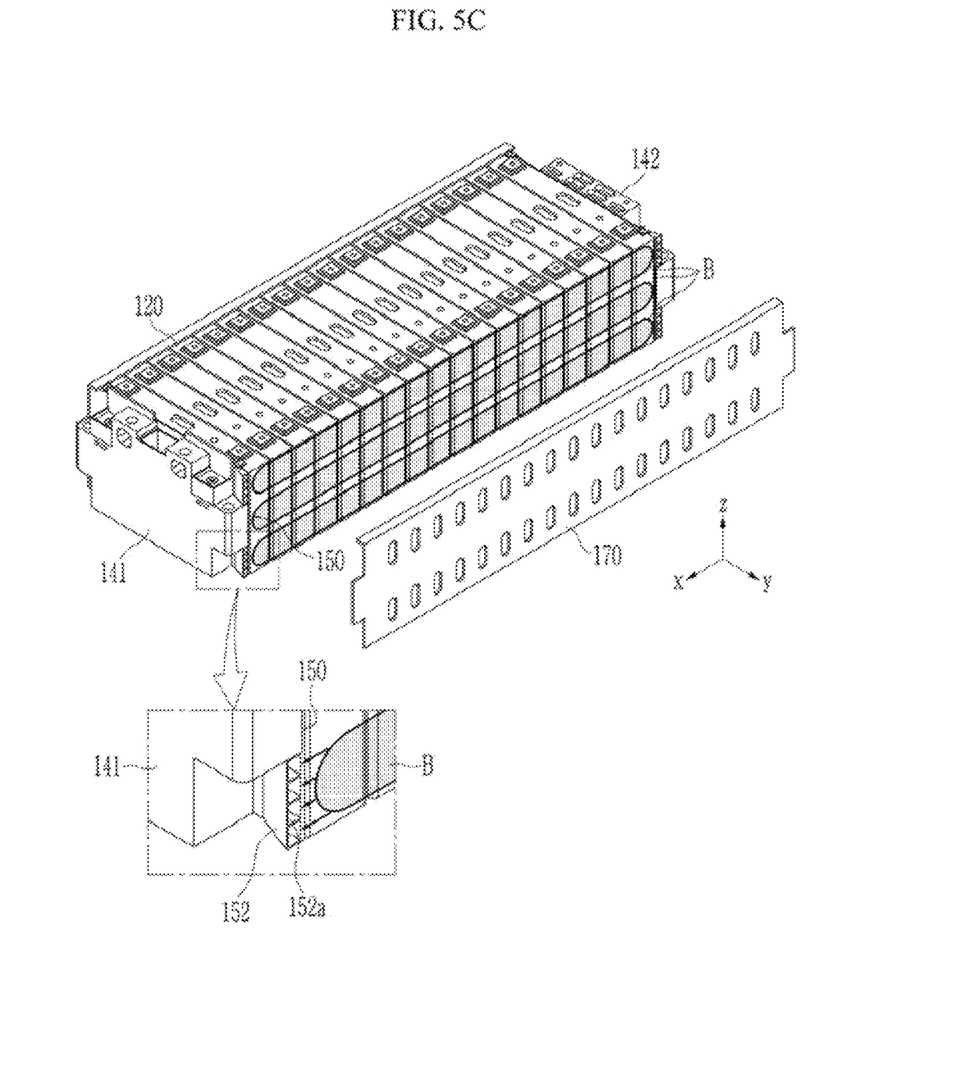

Next, the adhesive B may be applied to the narrow sides of the plurality of unit cells 120 (See FIG. 5C). In an implementation, the adhesive B may be widely applied to the narrow sides of the plurality of unit cells 120, and may also be applied to the narrow sides of the outermost unit cells 120 at both ends in the first direction.

Figure 5D:
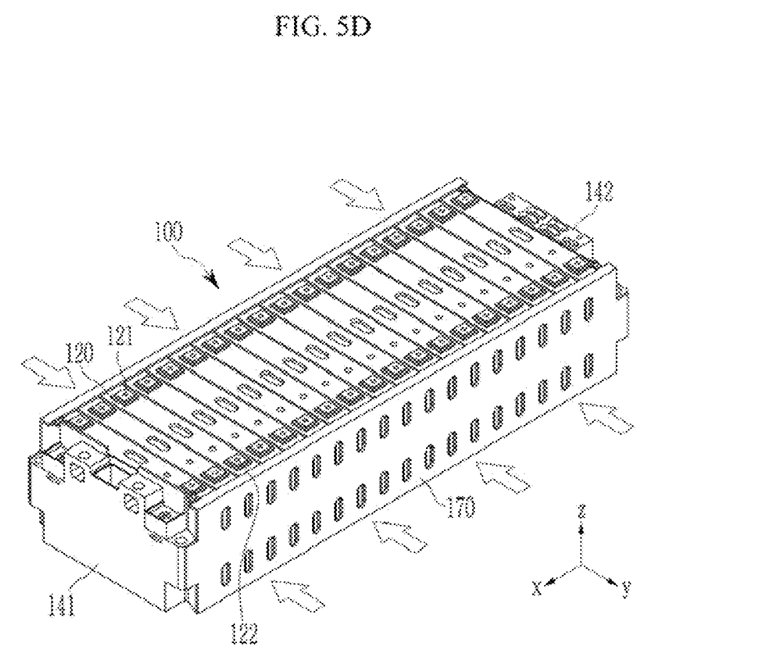

Next, the side plate 170 may be attached while being close to the narrow sides of the plurality of unit cells 120 (see FIG. 5D). The applied adhesive B may overflow toward the edge as the side plate 170 is in close contact. In an implementation, the adhesive accommodation buffers 151, 152, 153, and 154 on the end cell covers 150 and 160 may accommodate the overflowing adhesive B from or on the narrow sides of the outermost unit cells 120.

In an implementation, the accommodation grooves 151a, 152a, 153a, and 154a of the adhesive accommodation buffers 151, 152, 153, and 154 may be adjacent to the narrow sides of the outermost unit cells 120, and the overflowing adhesive B may be hardened while being accommodated in the accommodation grooves 151a, 152a, 153a, and 154a without undesirably spreading in or to other parts of the surrounding area. Therefore, adhesive application may be set with a margin without undesirably affecting the appearance and other process quality due to adhesive overflow.

Figure 6:
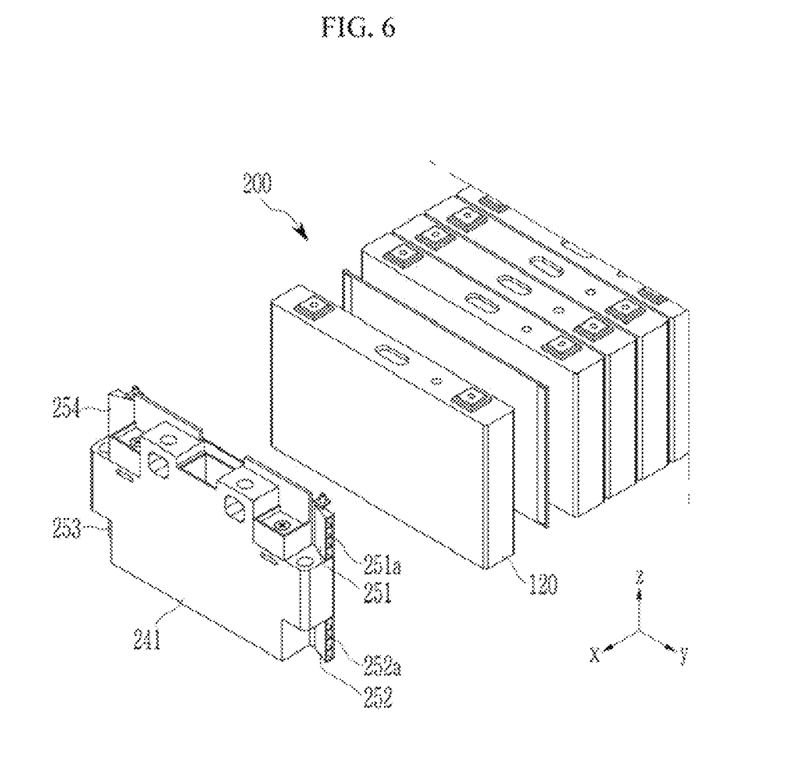
FIG. 6 is an exploded perspective view of a part of a rechargeable battery according to another embodiment.

FIG. 6 is an exploded perspective view of a part of a rechargeable battery module according to another embodiment.

Referring to FIG. 6, the rechargeable battery module 200 may include a plurality of unit cells 120, an end plate 241 at an outer side and adjacent to the outermost unit cell 120 among the plurality of unit cells 120, and a side plate 170 (refer to FIG. 1) configured to support a side surface of the plurality of unit cells 120.

In an implementation, one pair of end plates 241 may be on or at both sides of the plurality of unit cells 120 while being adjacent to the outermost unit cells 120 in a first direction (X-axis direction of the drawing) of the plurality of unit cells 120. The end plate 241 may support the plurality of unit cells 120 by pressing in the first direction.

The side plate 170 may have a plate shape extending in the first direction, and may be configured to support the side surfaces of the plurality of unit cells 120. The side plate 170 may be fixed by closely adhering to the side surfaces of the plurality of unit cells 120 in a state in which adhesive such as a bond is applied.

In an implementation, the end plate 241 may include adhesive accommodation buffers 251, 252, 253, and 254 adjacent to the edges thereof. In an implementation, the adhesive accommodation buffers 251, 252, 253, and 254 may be respectively formed adjacent to or at the four corners of the end plate 241. In an implementation, the adhesive accommodation buffers 251, 252, 253, and 254 may protrude outwardly from the end plate 241 and may protrude higher toward the edge. In an implementation, the protruding height (e.g., in the X direction) of the adhesive accommodation buffers 251, 252, 253, and 254 may gradually decrease from the edge to the inside (e.g., along the Y direction).

The adhesive accommodation buffers 251, 252, 253, and 254 may respectively include accommodation grooves 251a and 252a that are open outwardly from or at the edge of the end plate 241. For convenience of illustration, grooves of the adhesive accommodation buffers 253 and 254 are not shown in FIG. 6. The accommodation grooves 251a and 252a may open outwardly in the second direction (Y-axis direction in the drawing) that is perpendicular to the plane of the side plate 170. The accommodation grooves 251a and 252a may extend inwardly to have a depth in the second direction, and may be divided or separated into a plurality of accommodation grooves. In an implementation, the inlet ends of the accommodation grooves 251a and 252a may be aligned with the narrow sides of the outermost unit cells 120.

In an implementation, the rechargeable battery module may be formed using a prismatic rechargeable battery, but when it is a battery module having a structure that is pressed and supported with an end cell cover, an end plate, and a side plate by stacking unit cells of various types and shapes. In this regard, it will be possible to implement by applying the characteristic structure of the present disclosure.

By way of summation and review, the end plate and the side plate may be designed to cooperate with fastening structures that form the rechargeable battery module such that a plurality of unit cells may be firmly fixed with each other.

One or more embodiments may provide a rechargeable battery module designed to enable firmly attach a side plate to a side of a stacked plurality of unit cells.

In the rechargeable battery module according to the embodiment, the adhesive accommodation buffer may be at the edge of the end cell cover or end plate to absorb adhesive overflow when adhesive is applied to the side plate and then pressed, and thus it is possible to achieve more than the target adhesive application amount.

Accordingly, the side plate may be firmly attached to the side surfaces of the plurality of stacked unit cells, and thus a stable fastening structure may be achieved. In addition, the performance of the entire module may be increased by sufficiently applying the adhesive to the outer unit cell, which could be a weak point in terms of the rigidity of the rechargeable battery module.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A rechargeable battery module, comprising:
a plurality of unit cells that are stacked in a first direction and electrically connected with each other;
an end cell cover that is adjacent to an outermost unit cell in the first direction among the plurality of unit cells, the end cell cover including:
a first side facing the outermost unit cell and a second side opposite the first side, and
at least one adhesive accommodation buffer adjacent to an edge of the end cell cover, the at least one adhesive accommodation buffer protruding from the second side of the end cell cover to a varied distance;
an end plate at an outer side of the end cell cover and configured to support the plurality of unit cells by pressing the plurality of unit cells in the first direction; and
a side plate that extends in the first direction and is configured to support a side surface of the plurality of unit cells.

2. The rechargeable battery module as claimed in claim 1, wherein the at least one adhesive accommodation buffer includes at least one accommodation groove at the edge of the end cell cover, the at least one adhesive accommodation groove having an opening that is open outwardly in a second direction that is perpendicular to a plane of the side plate.

3. The rechargeable battery module as claimed in claim 2, wherein the at least one accommodation groove of the at least one adhesive accommodation buffer extends inwardly to have a depth in the second direction.

4. The rechargeable battery module as claimed in claim 2, wherein the at least one accommodation groove of the at least one adhesive accommodation buffer includes a plurality of separate accommodation grooves.

5. The rechargeable battery module as claimed in claim 2, wherein an inlet end of the at least one accommodation groove of the at least one adhesive accommodation buffer is aligned with a narrow side of the outermost unit cell.

6. The rechargeable battery module as claimed in claim 2, wherein the opening of the at least one accommodation groove of the at least one adhesive accommodation buffer is covered by the side plate.

7. The rechargeable battery module as claimed in claim 1, wherein the at least one adhesive accommodation buffer has an inclined shape that protrudes higher proximate to the edge of the end cell cover.

8. The rechargeable battery module as claimed in claim 1, wherein:
the end cell cover has a rectangular shape, and
the at least one adhesive accommodation buffer includes four adhesive accommodation buffers that are adjacent to four corners of the end cell cover, respectively.

9. A rechargeable battery module, comprising:
a plurality of unit cells that are stacked in a first direction and electrically connected with each other;
an end plate that is configured to support the plurality of unit cells, the end plate being adjacent to an outermost unit cell in a first direction of the plurality of unit cells;
at least one adhesive accommodation buffer protruding from a surface of the end plate that faces away from the plurality of unit cells, the at least one adhesive accommodation buffer having a three-dimensional shape and being adjacent to an edge of the end plate; and
a side plate that extends in the first direction and is configured to support a side surface of the plurality of unit cells.

10. The rechargeable battery module as claimed in claim 9, wherein the at least one adhesive accommodation buffer includes at least one accommodation groove at the edge of the end plate, the at least one accommodation groove having an opening that is open outwardly in a second direction that is perpendicular to a plane of the side plate.

11. The rechargeable battery module as claimed in claim 10, wherein the at least one accommodation groove of the at least one adhesive accommodation buffer extends inwardly to have a depth in the second direction.

12. The rechargeable battery module as claimed in claim 10, wherein the at least one accommodation groove of the at least one adhesive accommodation buffer includes a plurality of separate accommodation grooves.

13. The rechargeable battery module as claimed in claim 10, wherein an inlet end of the at least one accommodation groove of the at least one adhesive accommodation buffer is aligned with a narrow side of the outermost unit cell.

14. The rechargeable battery module as claimed in claim 10, wherein the opening of the at least one accommodation groove of the at least one adhesive accommodation buffer is covered by the side plate.

15. The rechargeable battery module as claimed in claim 9, wherein the at least one adhesive accommodation buffer includes at least one accommodation groove in an interior space of the three-dimensional shape.

16. The rechargeable battery module as claimed in claim 15, wherein the three-dimensional shape of the at least one adhesive accommodation buffer includes three surfaces contacting the end plate and enclosing the at least one accommodation groove.

17. The rechargeable battery module as claimed in claim 9, wherein the three-dimensional shape of the at least one adhesive accommodation buffer is an inclined shape that protrudes higher proximate to the edge of the end plate.

* * * * *